(12) United States Patent
Nakajima

(10) Patent No.: US 6,376,929 B1
(45) Date of Patent: *Apr. 23, 2002

(54) POSITION SWITCH OF SELECT LEVER FOR AUTOMATIC TRANSMISSION

(75) Inventor: Kenji Nakajima, Saitama (JP)

(73) Assignee: Honda Giken Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/419,796

(22) Filed: Oct. 18, 1999

(30) Foreign Application Priority Data

Dec. 17, 1998 (JP) .......................................... 10-359628

(51) Int. Cl.$^7$ ................................................ B60Q 1/00
(52) U.S. Cl. ........................ 307/10.1; 307/116; 341/35; 340/456
(58) Field of Search ........................ 307/116, 9.1, 10.1; 340/456; 341/35, 94, 192, 16; 200/293.1, 43.08, 61.88

(56) References Cited

U.S. PATENT DOCUMENTS

| | | | | |
|---|---|---|---|---|
| 4,610,179 A | * | 9/1986 | Parker | 200/61.88 |
| 4,914,594 A | * | 4/1990 | Sano | 340/456 |
| 5,049,879 A | * | 9/1991 | Symonds | 341/16 |
| 5,111,180 A | * | 5/1992 | Suzuki | 200/61.88 |
| 5,161,422 A | * | 11/1992 | Suman et al. | 307/10.1 |
| 5,325,083 A | * | 6/1994 | Nassar et al. | 340/456 |
| 5,370,015 A | * | 12/1994 | Moscatelli | 74/473 R |
| 5,444,613 A | * | 8/1995 | Tani et al. | 341/13 |
| 5,561,416 A | * | 10/1996 | Marshall et al. | 340/456 |
| 5,748,112 A | * | 5/1998 | Glonner | 341/16 |
| 5,847,344 A | * | 12/1998 | Denyer et al. | 200/61.88 |
| 5,852,953 A | * | 12/1998 | Ersoy | 74/473.12 |
| 5,867,092 A | * | 2/1999 | Vogt | 340/456 |
| 5,949,344 A | * | 9/1999 | Yasuda et al. | 341/16 |
| 6,018,294 A | * | 1/2000 | Vogel et al. | 340/456 |
| 6,072,390 A | * | 6/2000 | Dourra et al. | 340/456 |
| 6,096,988 A | * | 8/2000 | Tsukamoto et al. | 200/61.88 |
| 6,140,916 A | * | 10/2000 | Stollsteimer et al. | 340/456 |

FOREIGN PATENT DOCUMENTS

DE 004135362 A1 * 4/1993

* cited by examiner

Primary Examiner—Josie Ballato
Assistant Examiner—Roberto Rios
(74) Attorney, Agent, or Firm—Arent Fox Kintner Plotkin & Kahn

(57) ABSTRACT

A position switch of a select lever can switch in the ranges including "P", "R", "N", "D", "3", "2", "1" and the like. Code signals having combinations of "1" and "0" signals (on and off signals) to be respectively applied to a plurality of signal lines are arranged in such predetermined patterns as to correspond to the respective range positions and range-to-range intermediate positions "Z1"–"Z6". Patterns of code signals corresponding to the respective operating positions of a select lever are set in the whole operating position of the select lever in such a manner that even when a signal in any one of the signal lines L1–L5 remains to be "0", the combination of on and off signals is prevented from coinciding with the pattern of the signal corresponding to any operating position other than operating positions adjacent to each of the operation positions.

3 Claims, 6 Drawing Sheets

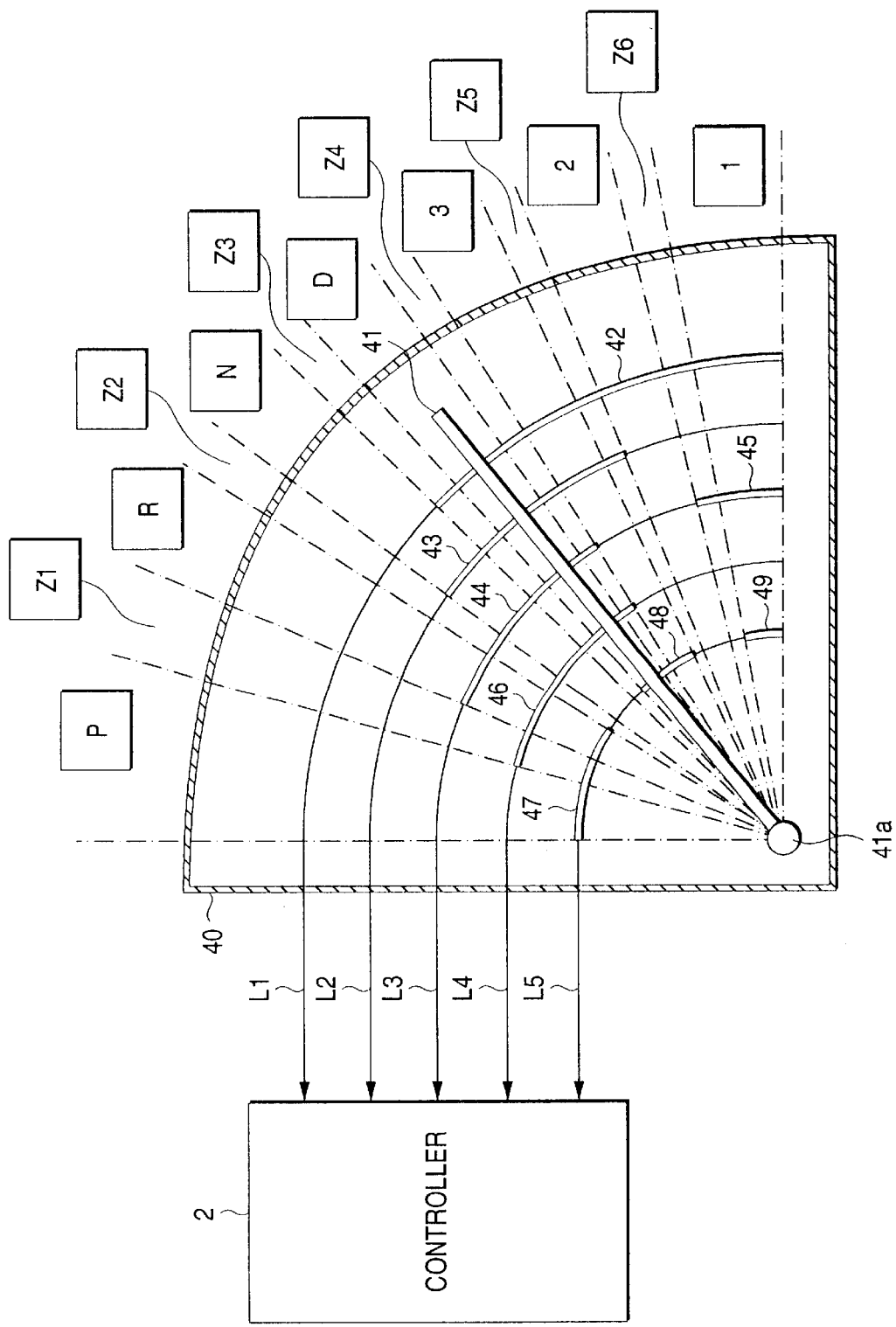

FIG. 3A

|    | L1 | L2 | L3 | L4 | L5 |
|----|----|----|----|----|----|
| P  | 0  | 0  | 0  | 0  | 1  |
| Z1 | 0  | 0  | 0  | 1  | 1  |
| R  | 0  | 0  | 1  | 1  | 1  |
| Z2 | 0  | 0  | 1  | 1  | 0  |
| N  | 0  | 1  | 1  | 1  | 0  |
| Z3 | 1  | 1  | 1  | 1  | 0  |
| D  | 1  | 1  | 1  | 1  | 1  |
| Z4 | 1  | 1  | 0  | 1  | 1  |
| 3  | 1  | 1  | 0  | 0  | 1  |
| Z5 | 1  | 1  | 0  | 0  | 0  |
| 2  | 1  | 0  | 0  | 0  | 0  |
| Z6 | 1  | 0  | 1  | 0  | 0  |
| 1  | 1  | 0  | 1  | 0  | 1  |

FIG. 3B

|    | L1 | L2 | L3 | L4 | L5 |
|----|----|----|----|----|----|
| P  |    |    |    |    | ×  |
| Z1 |    |    |    | P  | ×  |
| R  |    |    | Z1 | ×  | Z2 |
| Z2 |    |    | ×  | ×  |    |
| N  |    | Z2 | ×  | ×  |    |
| Z3 | N  | ×  | ×  | ×  |    |
| D  | ×  | ×  | Z4 | ×  | Z3 |
| Z4 | ×  | ×  |    | 3  | ×  |
| 3  | ×  | ×  |    |    | Z5 |
| Z5 | ×  | 2  |    |    |    |
| 2  | ×  |    |    |    |    |
| Z6 | ×  |    | 2  |    |    |
| 1  | ×  |    | ×  |    | Z6 |

FIG. 5A

|    | L1 | L2 | L3 | L4 | L5 |
|----|----|----|----|----|----|
| P  | 0  | 0  | 1  | 1  | 1  |
| Z1 | 0  | 0  | 0  | 1  | 1  |
| R  | 0  | 0  | 0  | 0  | 1  |
| Z2 | 0  | 1  | 0  | 0  | 1  |
| N  | 0  | 1  | 1  | 0  | 1  |
| Z3 | 1  | 1  | 1  | 0  | 1  |
| D  | 1  | 1  | 1  | 1  | 1  |
| Z4 | 1  | 1  | 0  | 1  | 1  |
| 3  | 1  | 1  | 0  | 1  | 0  |
| Z5 | 1  | 0  | 0  | 1  | 0  |
| 2  | 1  | 0  | 1  | 1  | 0  |
| Z6 | 1  | 0  | 1  | 0  | 0  |
| 1  | 0  | 0  | 1  | 0  | 0  |

FIG. 5B

|    | L1 | L2 | L3 | L4 | L5 |
|----|----|----|----|----|----|
| P  |    |    | Z1 | ×  | ×  |
| Z1 |    |    |    | R  | ×  |
| R  |    |    |    |    | ×  |
| Z2 |    | R  |    |    | ×  |
| N  |    | ×  | Z2 |    | ×  |
| Z3 | N  | ×  | ×  |    | ×  |
| D  | ×  | ×  | Z4 | Z3 | ×  |
| Z4 | ×  | ×  |    | ×  | 3  |
| 3  | ×  | Z5 |    | ×  |    |
| Z5 | ×  |    |    | ×  |    |
| 2  | ×  |    | Z5 | Z6 |    |
| Z6 | 1  |    | ×  |    |    |
| 1  |    |    | ×  |    |    |

FIG. 6

|    | L1 | L2 | L3 | L4 |
|----|----|----|----|----|
| P  | 0  | 0  | 1  | 0  |
| Z1 | 0  | 0  | 1  | 1  |
| R  | 0  | 0  | 0  | 1  |
| Z2 | 0  | 1  | 0  | 1  |
| N  | 0  | 1  | 0  | 0  |
| Z3 | 1  | 1  | 0  | 0  |
| D  | 1  | 1  | 1  | 0  |
| Z4 | 1  | 1  | 1  | 1  |
| 3  | 1  | 1  | 0  | 1  |
| Z5 | 1  | 1  | 1  | 1  |
| 2  | 1  | 0  | 1  | 1  |
| Z6 | 1  | 1  | 1  | 1  |
| 1  | 0  | 1  | 1  | 1  |

POSITION SWITCH OF SELECT LEVER FOR AUTOMATIC TRANSMISSION

BACKGROUND OF THE INVENTION

1. Field of the Invention

This invention relates to a position switch for detecting the operating position of a select lever for use in switching ranges of an automatic transmission.

2. Description of the Related Art

One known conventional position switch of the sort stated above is provided with four signal lines of L1–L4 so that, as shown in FIG. 6, on and off signals are outputted to the signal lines in such predetermined combinations as to correspond to the respective operating positions of a select lever. In this case, as shown in FIG. 6, "1" represents an ON signal and "0" an OFF signal. The ON signal is applied to the following signal lines: to the signal line of L3 in the parking range position of "P"; to the signal line of L4 in the reverse range position of "R"; to the signal line of L2 in the neutral range position of "N"; to the signal lines of L1, L2 and L3 in the range position of "D" for automatic transmission; to the signal lines of L1, L2 and L4 in the range position of "3" for automatic transmission up to three speeds; to the signal lines of L1, L3 and L4 in the range position of "2" for holding second speed; to the signal lines of L2, L3 and L4 in the range position of "1" for holding first speed; to the signal lines of L3 and L4 in the position of "Z1" between "P" and "R"; to the signal lines of L2 and L4 in the position of "Z2" between "R" and "N"; to the signal lines of L1 and L2 in the position of "Z3" between "N" and "D"; and to the signal lines of L1, L2, L3 and L4 in the position of "Z4" between "D" and "3", in the position of "Z5" between "3" and "2" and in the position of "Z6" between "2" and "1".

When the signal line of L1 is broken in the aforementioned conventional position switch, combinations of the on and off signals in the respective positions of "Z4", "Z5" and "Z6" turn out to be the same combination of "0, 1, 1 and 1" as that in the range position of "1". When the signal line of L1 is broken at the time the range "D" is switched to the range "3", the behavior of the vehicle may be badly affected by the establishment of first speed stage during high-speed traveling because the position of "Z4" is misjudged to be the range position of "1".

SUMMARY OF THE INVENTION

In view of the foregoing problems, the present invention is intended to provide a position switch so arranged that the behavior of a vehicle is prevented from being badly affected by the misjudgment made on a switching range when a signal line is broken.

In order to solve the foregoing problems according to the present invention, there is provided a position switch for detecting the operating position of a select lever for use in switching ranges of an automatic transmission, the position switch which includes a plurality of signal lines and which is arranged so that on and off signals may be applied to the signal lines in such predetermined combinations as to correspond to the respective operating positions of the select lever. Combinations of on and off signals corresponding to the respective positions of the select lever are set in the whole operating position of the select lever in such a manner that even when a signal in any one of the signal lines out of the plurality of signal lines remains to be an off signal, the combination of on and off signals is prevented from coinciding with a combination of on and off signals corresponding to any operating position other than operating positions adjacent to each of the operation positions.

According to the present invention, the operating position of the select lever includes range positions of "P", "R", "N", "D", "3", "2", "1" and the like, and intermediate positions "Z1"–"Z6" and the like between the range positions. The operating position adjacent to each range position is the intermediate position between each range position and the adjoining range position. The operating positions adjacent to each intermediate position are the range positions with the intermediate position held therebetween.

Even when any one of the signal lines to which the on signal is applied is broken and causes the signal of the signal line to become the off signal in each range position, the range position is not misjudged to be any other range position but only misjudged to be the adjoining intermediate position according to the present invention. Similarly, a range position that may be misjudged in each intermediate position is only what is adjacent to the intermediate position and this prevents the behavior of a vehicle from being badly affected thereby.

BRIEF DESCRIPTION OF THE DRAWINGS

FIG. 2 is a diagram illustrating an example of a switch according to the present invention;

FIG. 3A is a diagram showing patterns of code signals to be outputted from the switch of FIG. 2;

FIG. 3B is a diagram showing operating positions that are misjudged when signal lines are broken;

FIG. 5A is a diagram showing patterns of code signals in another embodiment of the invention;

FIG. 5B is a diagram showing operating positions that are misjudged when signal lines are broken; and FIG. 6 is a diagram showing patterns of conventional code signals.

DETAILED DESCRIPTION OF THE PREFERRED EMBODIMENTS

Figure 1:
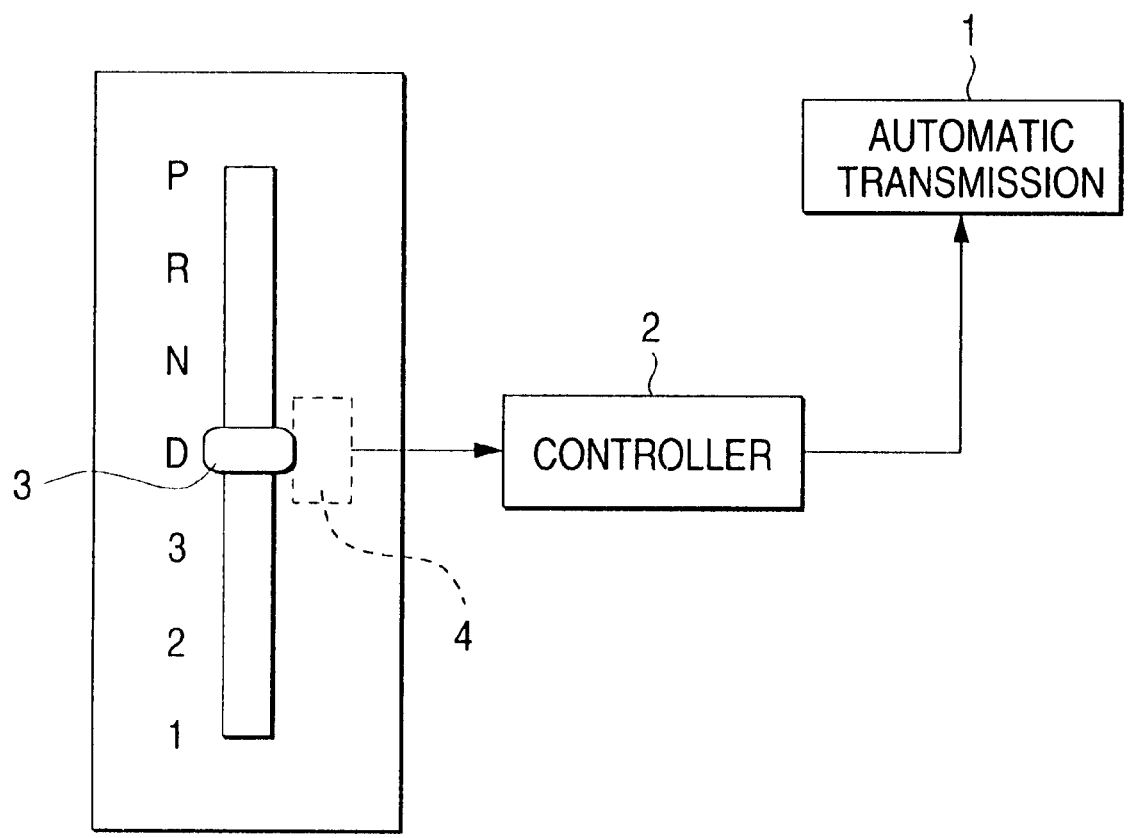
FIG. 1 is a block diagram illustrating a control system of an automatic transmission having a switch according to the present invention.

Referring to FIG. 1, a vehicular automatic transmission 1 performs control corresponding to the range selected through the operation of a select lever 3 by inputting to a controller 2 composing of a computer mounted on a vehicle for controlling the automatic transmission 1, a signal from a position switch 4 for detecting the operating position of the select lever 3 for switching ranges.

The select lever 3 is capable of switching range positions: namely, among the parking range position of "P"; the reverse range position of "R"; the neutral range position of "N"; the range position of "D" for automatic transmission; the range position of "3" for automatic transmission up to three speeds; the range position of "2" for holding second speed; and the range position of "1" for holding first speed.

As shown in FIG. 2, a movable contact piece 41 capable of swinging around a pivot shaft 41a in a manner interlocking with the select lever 3 is provided within the switch case 40 of the position switch 4. Five signal lines of L1–L5 are also provided concentrically relative to the pivot shaft 41a, each signal line being provided with a contact section that is brought into contact with the movable contact piece 41 within the predetermined operating range of the select lever 3. More specifically, a contact section 42 that is brought into contact with the movable contact piece 41 from the position of "Z3" between the range positions of "N" and "D" over the range position of "1" is attached to the signal line of L1. A contact section 43 that is brought into contact with the movable contact piece 41 from the range position of "N" over the position of "Z5" between the range positions of "3" and "2" is attached to the signal line of L2. A contact section 44 that is brought into contact with the movable contact piece 41 from the range position of "R" over the range position of "D", and a contact section 45 that is brought into contact with the movable contact piece 41 from the position of "Z6" between the range positions of "2" and "1" over the range position of "1" are attached to the signal line of L3. A contact section 46 that is brought into contact with the movable contact piece 41 from the position of "Z1" between the range positions of "P" and "R" over the position of "Z4" between the range positions of "D" and "3" is attached to the signal line of L4. To the signal line of L5, further, a contact section 47 that is brought into contact with the movable contact piece 41 from the range position of "P" over the range position of "R", a contact section 48 that is brought into contact with the movable contact piece 41 from the range position of "D" over the range position of "3", and a contact section 49 that is brought into contact with the movable contact piece 41 in the range position of "1" are attached.

Combinations of on and off signals to be outputted to signal lines of L1–L5 in the range positions of "P", "R", "N", "D", "3", "2" and "1", and the respective intermediate positions of "Z1", "Z2", "Z3", "Z4", "Z5" and "Z6" between these range positions are as shown in FIG. 3A on condition that "1" represents an ON signal and "0" an OFF signal. A 5-bit code signal is then inputted to the controller 2 via the signal lines of L1–L5 so that the actual operating position of the select lever 3 may be decided on the basis of the code signal.

In a case where when any one of the signal lines of L1–L5 is broken and the broken signal line remains to be "0", the operating position of the select lever 3 is misjudged as shown in FIG. 3B.

Specifically, in case that the signal line of L1 is broken, in the range position of "Z3", the code signal of the same pattern of "01110" as the pattern in the range position of "N" is outputted, and the position of "Z3" is misjudged to be the range position of "N". However, in each of the positions of "P", "Z1", "R", "Z2" and "N", a code signal having the same pattern as the pattern in the normal condition is outputted at the breakage of the signal line of L1. On the other hand, in the respective positions of "D", "Z4", "3", "Z5", "2", "Z6" and "1", code signals having patterns unlikely to occur in all the range positions from "P" to "1" are outputted.

In case that the signal line of L2 is broken, in the range position of "N", a code signal having the same pattern of "00110" as the pattern in the position of "Z2" is outputted, and in the range position of "Z5", a code signal having the same pattern of "10000" as the pattern in the range position of "2" is outputted. Consequently, the range position of "N" and the position of "Z5" are respectively misjudged to be the position of "Z2" and the range position of "2". In addition, in each of the positions of "P", "Z1", "R", "Z2", "2", "Z6" and "1", a code signal having the same pattern as the pattern in the normal condition is outputted at the breakage of the signal line of L2. On the other hand, in the respective positions of "Z3", "D", "Z4" and "3", code signals having patterns unlikely to occur in all the range positions from "P" to "1" are outputted.

In case that the select lever L3 is broken; in the range position of "R", a code signal having the same pattern of "00011" as the pattern in the position of "Z1" is outputted; in the range position of "D", a code signal having the same pattern of "11011" as the pattern in the position of "Z4" is outputted; and in the position of "Z6", a code signal having the same pattern of "10000" as the pattern in the range position of "2" is outputted. Consequently, the range positions of "R" and "D" and the position of "Z6" are respectively misjudged to be the positions of "Z1" and "Z4", and the range position of "2". However, in each of the positions of "P", "Z1", "Z4", "3", "Z5" and "2", a code signal having the same pattern as the pattern in the normal condition is outputted. Additionally, in the respective positions of "Z2", "N", "Z3" and "1", code signals having patterns unlikely to occur in all the positions from "P" to "1" are outputted.

In case that the select lever L4 is broken; in the position of "Z1", a code signal having the same pattern of "00001" as the pattern in the range position of "P" is outputted, and in the position of "Z4", a code signal having the same pattern of "110011" as the pattern in the range position of "3" is outputted. Consequently, the positions of "Z1" and "Z4" are respectively misjudged to be the range positions of "P" and "3". However, in each of the positions of "P", "3", "Z5", "2", "Z6" and "1", a code signal having the same pattern as the pattern in the normal condition is outputted. Additionally, in the respective positions of "Z", "Z2", "N", "Z3" and "D", code signals having patterns unlikely to occur in all the positions from "P" to "1" are outputted.

In case that the select lever L5 is broken; in the range position of "R", a code signal having the same pattern of "00110" as the pattern in the position of "Z2" is outputted; in the range position "D", a code signal having the same pattern of "11110" as the pattern in the position of "Z3" is outputted; in the range position of "3", a code signal having the same pattern of "11000" as the pattern in the position of "Z5" is outputted; and in the range position "1", a code signal having the same pattern of "10100" as the pattern in the position of "Z6" is outputted. Consequently, the range positions of "R", "D", "3" and "1" are respectively misjudged to be the positions of "Z2", "Z3", "Z5" and "Z6". However, in each of the positions of "Z2", "N", "Z3" "Z5", "2" and "Z6", a code signal having the same pattern as the pattern in the normal condition is outputted. Additionally, in the respective positions of "P", "Z1" and "Z4", code signals having patterns unlikely to occur in all the positions from "P" to "1" are outputted.

When the pattern of the code signal corresponding to each operating position is set as shown in FIG. 3A, it is thus avoided to misjudge the actual operating position of the select lever 3 to be any position other than what is adjacent thereto even though any one of the signal lines of L1–L5 is broken, which prevents the behavior of a vehicle from being badly affected by the misjudgment. When any one of the signal lines of L1–L5 is broken, moreover, a code signal having a pattern unlikely to occur in all the positions from "P" to "1" is outputted from the range position of frequently used "P" up to the range position of "D" and this makes it easy to detect the disconnection.

Figure 4:
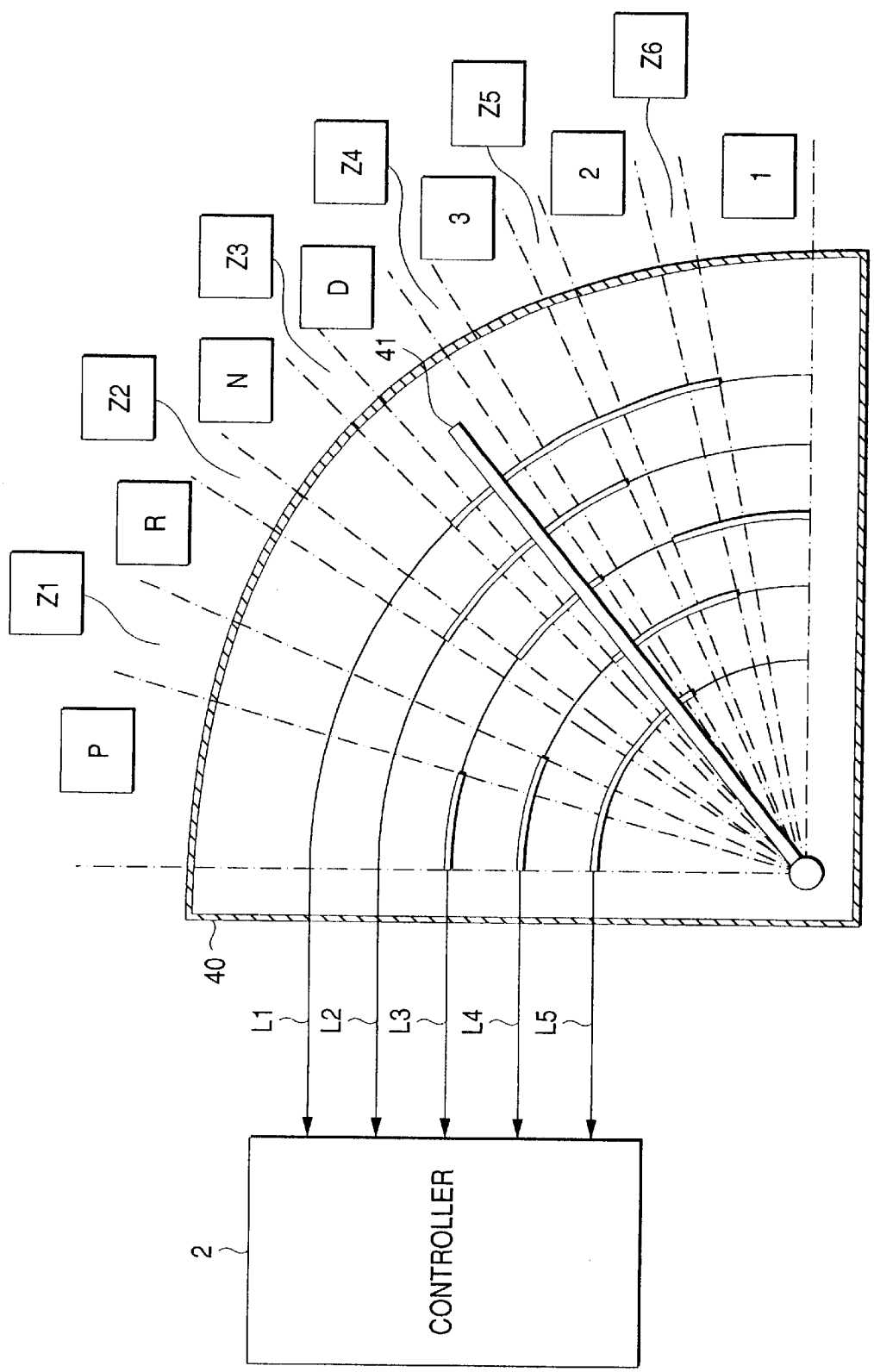
FIG. 4 is a diagram illustrating another embodiment of the switch according to the present invention.

Further, altering the positions of contact sections to be attached to the respective signal lines of L1–L5 as shown in FIG. 4 so as to set the pattern of a code signal corresponding to each operating position as shown in FIG. 5A also prevents the actual operating position of the select lever 3 from being misjudged to be any position other than what is adjacent thereto even though any one of the signal lines of L1–L5 is broken. As shown in FIG. 5B, when the signal line of L1 is broken, the position of "Z3" is misjudged to be the range position of "N" and the position of "Z6" is misjudged to be the range position of "1". When the signal line of L2 is broken, the position of "Z2" is misjudged to be the range position of "R" and the range position of "3" is misjudged to be the position of "Z5". When the signal line of L3 is broken, the range position of "P" is misjudged to be the position of "Z1", the range position of "N" is misjudged to be the position of "Z2", the range position of "D" is misjudged to be the position of "Z4", and the range position of "2" is misjudged to be the position of "Z5". When the signal line of L4 is broken, the position of "Z1" is misjudged to be the range position of "R", the range position of "D" is misjudged to be the position of "Z3", and the range position of "2" is misjudged to be the position of "Z6". When the signal line of L5 is broken, the position of "Z4" is misjudged to be the range position of "3". In any one of these cases, however, the actual operating position of the select lever 3 is only misjudged to be what is adjacent thereto, whereby the behavior of the vehicle is prevented from being badly affected by the misjudgment.

The operating positions with marks x in FIG. 5B where code signals having patterns unlikely to occur are outputted indicate positions of "D", "Z4", "3", "Z5" and "1" when the signal line of L1 is broken; positions of "Z3", "D" and "Z4" when the signal line of L2 is broken; positions of "N", "Z3", "Z6" and "1" when the signal line of L3 is broken; positions of "P", "Z4", "3" and "Z5" when the signal line of L4 is broken; and positions of "P", "Z1", "R", "Z2", "N", "Z3" and "D" when the signal line of L5 is broken. When any one of the signal lines of L1–L5 is broken, a code signal having a pattern unlikely to occur is thus outputted from the range position of "P" up to the range position of "D" and this makes it easy to detect the disconnection.

As is obvious from the above description, the behavior of the vehicle is prevented from being badly affected by the range misjudgment when the signal line is broken according to the present invention.

While only certain embodiments of the invention have been specifically described herein, it will apparent that numerous modifications may be made thereto without departing from the spirit and scope of the invention.

The present disclosure relates to the subject matter contained in Japanese patent application No. Hei. 10-359628 filed on Dec. 17, 1998 which is expressly incorporated herein by reference in its entirety.

What is claimed is:

1. An electronic fail-safe position switch apparatus adapted for mechanical connection to a gear select device for a transmission and electrically connected to a controller for receiving electrical signals from a plurality of signal lines electrically connected to the electronic fail-safe position switch apparatus and for controlling a selection of a gear from among a plurality of gears housed in the transmission as a function of a combination of received electrical signals, a different combination of electrical signals being associated with a particular one of the gears, the electronic fail-safe position switch apparatus comprising:

a position switch having a plurality of operating positions with each operating position associated with a different one of a plurality of combinations of electrical signals in a normal state, the plurality of operating positions including a plurality of range positions with a respective range position being associated with a respective particular gear and a respective particular combination of electrical signals and a plurality of intermediate positions unassociated with any particular gear in the normal state but each intermediate position being associated with a respective particular combination of electrical signals, a respective one of the intermediate positions being disposed between consecutive ones of the range positions, wherein, in a fault state where one of the signal lines fails, at least two of the combinations of electrical signals associated with their respective operating positions change while remaining ones of the combinations of electrical signals associated with their respective operating positions remain the same in the fault state as in the normal state, at least one of the at least two of the combinations of electrical signals that changes in the fault state is identical to one of the remaining ones of the combination of electrical signals, the operating position associated with the at least one of the at least two of the combinations of electrical signals that changes is disposed immediately adjacent to an operating position associated with one of the remaining ones of the combinations of electrical signals that did not change and wherein, other ones of the at least two of the combinations of electrical signals that change in the fault state are different from all combinations of electrical signals existing after failure of the one signal line.

2. An electronic fail-safe position switch apparatus for detecting an operating position of a select lever for use in switching ranges of an automatic transmission, the position switch apparatus comprising:

a plurality of signal lines respectively outputting On and Off signals in accordance with respective operating positions of the select lever, said operating positions including a plurality of range positions each associated with a particular gear and a plurality of intermediate positions disposed between said range positions, each of said operating positions being associated with a particular combination of On and Off signals, wherein, when the select lever is in any of the plurality of range positions in a fault state when any of said signal lines fail, either the outputted combination of On and Off signals for the select lever range always coincides with a particular combination of On and Off signals associated with the intermediate position directly adjacent to the select lever range position, or the outputted combination of On and Off signals for the select lever range position is unassociated with all of the range positions and the intermediate positions, and wherein, when the select lever is in any of the plurality of intermediate positions in the fault state, either the outputted combination of On and Off signals for the select lever intermediate position always coincides with a particular combination of On and Off signals associated with the range position directly adjacent to the select lever intermediate position, or the outputted combination of On and Off signals for the select lever intermediate position is unassociated with all of the range positions and the intermediate positions.

3. An electronic fail-safe position switch apparatus for determining operating positions of a select lever for use in an automatic transmission comprising:

a plurality of signal lines operable to output On and Off signals in response to detected operating positions select lever, the operating positions including a plurality of range positions each associated with a particular gear, and a plurality of intermediate positions disposed between the range positions, each of the operating positions being associated with a particular combination of On and Off signals, wherein when any of the plurality of signal lines fail, all outputted combinations of On and Off signals differ, except for at least one outputted combination of On and Off signals associated with a respective range position and intermediate position directly adjacent to one another.

* * * * *